Sept. 16, 1958  H. ORSTETT  2,852,290
GOOSE NECK BEARING FOR A BOOM
Filed June 11, 1954  2 Sheets-Sheet 1

INVENTOR.
Hjalmar Orstett
BY
J. H. Golden
ATTORNEY

Sept. 16, 1958   H. ORSTETT   2,852,290
GOOSE NECK BEARING FOR A BOOM
Filed June 11, 1954   2 Sheets-Sheet 2

INVENTOR.
Hjalmar Orstett
BY
A.H.Golden
ATTORNEY

United States Patent Office 2,852,290
Patented Sept. 16, 1958

2,852,290

GOOSE NECK BEARING FOR A BOOM

Hjalmar Orstett, Valley Stream, N. Y.

Application June 11, 1954, Serial No. 435,965

1 Claim. (Cl. 287—100)

This invention relates to the mounting of a cargo boom relatively to a king post. More particularly, the invention relates to a novel form of goose neck and its mounting whereby the goose neck is adapted to support a cargo boom and a bracket for a heel block through which the load on the cargo boom is manipulated by a winch.

In cargo ships, as those skilled in the art fully appreciate, it is customary to mount a cargo boom on a goose neck for pivotal movement in a vertical plane and for rotating movement in a horizontal plane under the control of a booming guy and a topping lift. The load manipulated by the cargo boom is supported through a cargo runner cable that is wound by a winch through a heel block.

In conventional structures, the goose neck that supports the cargo boom, because of the very severe stresses applied thereto and because of its exposure to the weather, is a source of very considerable difficulty. It requires frequent servicing, repair, and replacement. While the problem has existed for many years, no one, insofar as I know, has devised a mounting for the cargo boom and its associated heel block that will withstand weather conditions and will operate freely and without difficulty. I have installed on ships a considerable number of structures fabricated in accordance with the teachings of the invention herein to be set forth, and have found the said structure exceedingly effective, trouble free, and of long life.

As a feature of my invention, I utilize a goose neck to which the cargo boom is pivoted, this goose neck being adapted for mounting on a bearing member through spaced upper and lower vertically aligned non-friction bearings that maintain the goose neck securely against cocking relatively to the bearing member. Because of this arrangement, I am able to utilize a horizontal type of bearing, preferably of the roller type, for carrying solely and exclusively, the vertical loads imposed by the cargo boom on the goose neck.

At the same time, through the slotting between the bearing support members, I am able to secure to the goose neck a heel block carrying bracket that is positioned between the two vertically aligned bearings. These vertically aligned bearings then accept all thrust from the heel block through its bracket, as well as all lateral thrusts imparted to the goose neck, relieving the horizontal anti-friction bearing of all stresses except the vertical stresses imparted thereto. The novel arrangement thus conceived by me makes possible the effective movement of the cargo boom, because there are no compound thrusts or stresses applied to the several bearings despite the extremely diverse force vectors that must be absorbed by the goose neck upon the manipulation of the cargo boom and the heel block over which traverses the cargo runner cable.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claim appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, Fig. 1 is a diagrammatic and schematic view of a cargo boom support utilizing my invention and illustrating the mounting of the king post, winch, and other associated parts that have already been alluded to briefly in the specification.

Figure 1:
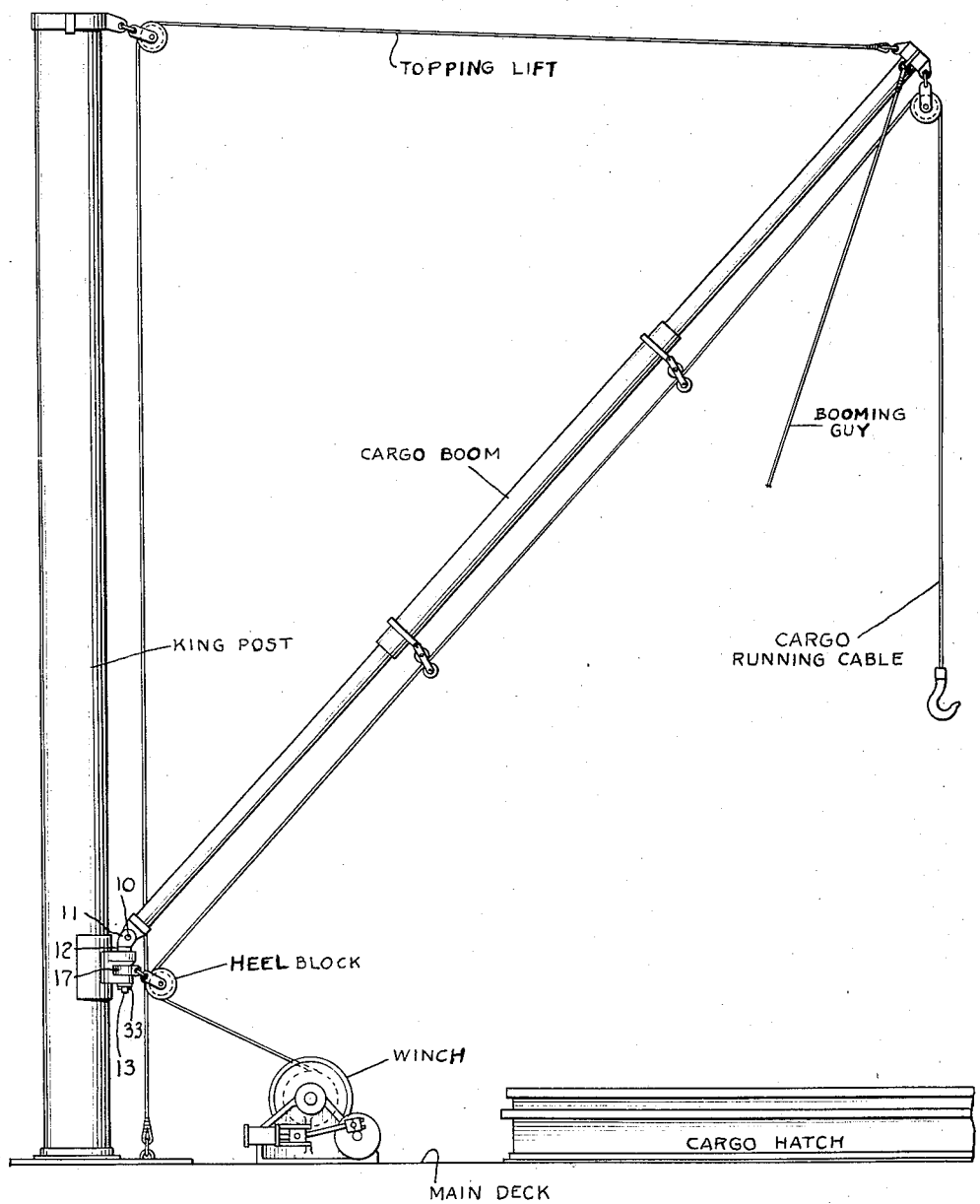
Figure 2:
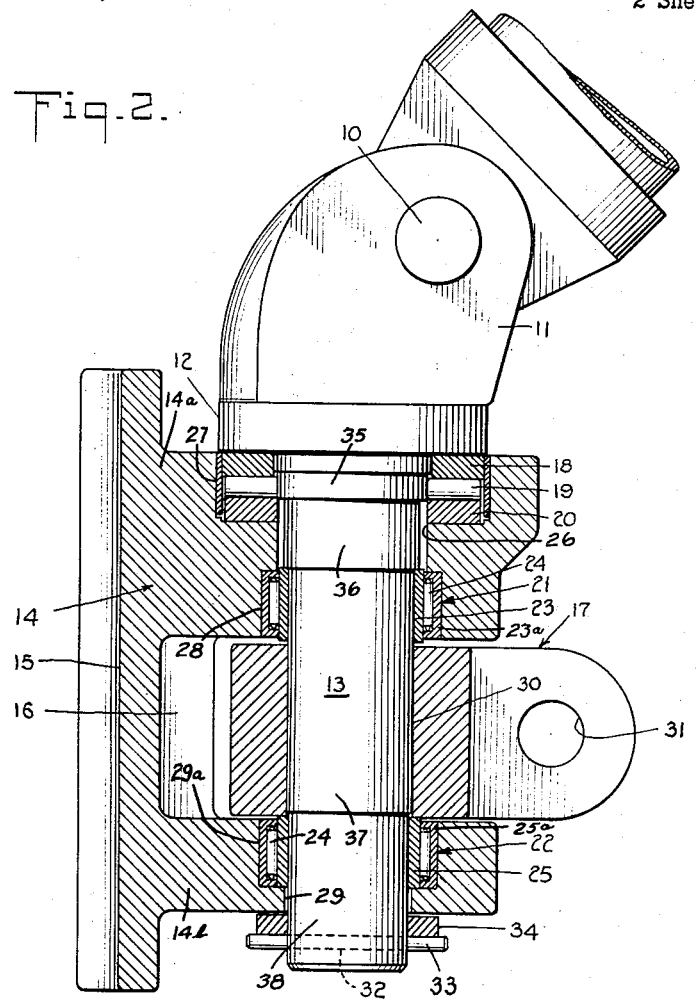
Fig. 2 is a vertical section through the goose neck bearing of my invention.
Figure 3:
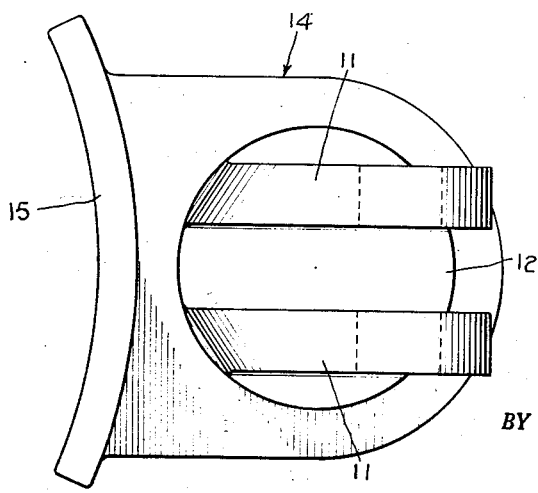
Fig. 3 is a view looking downwardly on the goose neck and the bearing member, but with the boom omitted.

Referring now more particularly to the drawings, the cargo boom is pivoted at 10 to bifurcated upper end portion 11 of my goose neck boom support. A flange 12 is formed integrally with the upper end portion 11. A post 13 extends downwardly from the flange 12 and is integral with the goose neck. The bearing member of my invention as designated generally by reference numeral 14 includes an upright arcuate plate 15 which is suitably bolted or otherwise secured to the king post of the ship. The bearing member 14 has an upper bearing support 14a and a lower bearing support 14b integrally formed with the arcuate plate 15 and spaced apart vertically to provide a slot 16 therebetween to receive a heel block bracket 17.

The upper bearing support 14a is provided with a vertical bore 26 having an enlarged diameter upper end portion 27 and an enlarged diameter lower end portion 28. The diameter of the upper end portion 27 is somewhat greater than the diameter of the lower end portion 28.

The lower bearing support 14b is provided with a vertical bore 29 axially aligned with the vertical bore 26 and having an enlarged diameter upper end portion 29a.

An upper race 18, radially extending horizontal bearing rollers 19, and lower race 20 are positioned in the enlarged diameter upper end portion 27 of the bore 26 in supporting relation to the flange 12.

The upper race 18 of this bearing lies directly under the flange 12 with the bearing rollers 19 supporting the race 18 and the flange 12 relatively to the lower race 20. Those skilled in the art will appreciate that tremendous horizontal thrusts are applied against the goose neck, and through my invention the horizontal bearing 18, 19, 20 is not required to accept those thrusts. The post 13 has the upper race 18 engaged thereon at the upper end of the post 13. The post 13 has a reduced diameter portion 35 formed thereon with its upper end arranged in substantial alignment with the lower edge of the upper race 18. A further reduced diameter portion 36 is arranged with its upper end arranged in substantial alignment with the upper edge of the lower race 20. A still further reduced diameter portion 37 of the post 13 is arranged with its upper end arranged in substantial alignment with the upper edge of the enlarged diameter lower end portion 28 of the bore 26. The post 13 is provided with a reduced diameter lower end portion 38 having its upper end in substantial alignment with the upper edge of the lower bearing support 14b. The post 13 is adapted for maintenance in a vertical position relatively to the bearing member 14 through an upper non-friction bearing indicated generally at 21 and a lower non-friction bearing indicated generally at 22, these bearings being vertically aligned with the post 13. The bearing 21 includes an inner race 23 mounted on the portion 37 of the post 13 in engagement with the lower end of the portion 36 thereof. A plurality of vertical bearing rollers 24 are arranged in engagement with the inner race 23 and are supported by an outer race 23a mounted in the enlarged diameter lower end portion 28 of the bore 26.

The bearing 22 includes an inner race 25 mounted on the portion 38 of the post 13 in engagement with the lower end of the portion 37 thereof. A plurality of vertical bearing rollers 24 are arranged in engagement with the inner race 25 and are supported by an outer race 25a mounted in the enlarged diameter upper end portion 29a of the bore 29.

It will further be noted that the rollers 24 of the bearings 21, 22 are of rather considerable length relatively to the length of the post 13 of my goose neck. Therefore, these rollers 24 will maintain the post 13 for accurate rotation about its axis, relieving the bearing 18, 19, 20 of anything other than vertical thrust loads. It will also be noted that the heel block bracket 17 is maintained in assembled relation to the post 13, the post 13 traversing a bore 30 in the heel block bracket. Obviously, the bearings 21 and 22 will absorb all stresses applied by the heel block bracket 17 to the post 13. The heel block is itself secured to the heel block bracket 17 through a pin traversing ears 31 of the bracket.

The lower end of the post 13 is drilled as at 32 for a pin 33 that holds it assembled to the bearing member 14, the pin 33 operating through the intermediary of a washer 34.

It is quite obvious that through very simple means and an extremely simple construction, my goose neck will operate effectively to support the cargo boom and the heel block, all as will be quite obvious to those skilled in this art. It is emphasized further that those skilled in the art will appreciate at once the very considerable contribution that has been made by my invention to fill a long-felt need.

I now claim:

A boom support for mounting the foot of a boom to the king post of a ship comprising an upright arcuate plate adapted for attachment to the king post of a ship, an upper bearing support integrally joined to said plate and extending horizontally therefrom, a lower bearing support integrally joined to said plate and extending horizontally therefrom in vertically spaced relation below said upper bearing support, said upper bearing support having a vertical bore extending therethrough with said bore having an enlarged diameter upper end portion and an enlarged diameter lower end portion with the diameter of said upper end portion being substantially greater than the diameter of said lower end portion, said lower bearing support having a vertical bore extending therethrough in axial alignment with the vertical bore in said upper bearing support, the vertical bore in said lower bearing support having an enlarged diameter upper end portion, a goose neck boom support including a bifurcated upper end portion, a horizontal circular flange integrally formed on the lower end of said bifurcated upper end portion, a vertical post integrally formed axially on said flange in depending relation thereto, an annular horizontal bearing lower race positioned in the enlarged diameter upper end portion of the vertical bore in said upper bearing support, a plurality of radially arranged horizontal roller bearings supported on said lower race, an annular horizontal bearing upper race secured to said post in engagement with said flange, said upper race being supported for antifriction rotary movement on said roller bearings with said post extending through the vertical bores in said upper and lower bearing supports, said post having a reduced diameter central portion with the upper end thereof terminating in substantial horizontal alignment with the upper end of the enlarged diameter lower end portion of the vertical bore in said upper bearing support, a tubular inner bearing race secured to the upper end of the reduced diameter central portion of said post, an annular outer race mounted in the enlarged diameter lower end portion of the vertical bore in said upper bearing support, a plurality of vertically extending roller bearings supported by said outer race and engaging said inner race, said post having a further reduced diameter lower end portion with the upper end thereof terminating in substantial horizontal alignment with the top of said lower bearing support, a tubular inner bearing race secured to the upper end of said further reduced lower end portion, an annular outer race mounted in the enlarged diameter upper end portion of the vertical bore in said lower bearing support, a plurality of vertically extending roller bearings supported by said last named outer race and engaging said last named inner race, a washer engaged over the lower end of said post below said lower bearing support, and a pin transversely extending through said post below said washer securing said post in said upper and lower bearing supports for rotary movement about a vertical axis.

References Cited in the file of this patent

UNITED STATES PATENTS

| | | |
|---|---|---|
| 1,899,555 | Campbell | Feb. 28, 1933 |
| 1,991,303 | Waits | Feb. 12, 1935 |
| 2,065,740 | Reed | Dec. 29, 1936 |
| 2,186,241 | Glasgow | Jan. 9, 1940 |